(12) United States Patent
Spaven et al.

(10) Patent No.: US 12,149,195 B2
(45) Date of Patent: Nov. 19, 2024

(54) METHOD AND SYSTEM FOR CONTROLLING AN ELECTRIC MACHINE

(71) Applicant: GM GLOBAL TECHNOLOGY OPERATIONS LLC, Detroit, MI (US)

(72) Inventors: Kerrie M. Spaven, Rochester Hills, MI (US); Brent S. Gagas, Pleasant Ridge, MI (US); Brian J. Gallert, Lake Orion, MI (US); Brian A. Welchko, Oakland Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 159 days.

(21) Appl. No.: 18/087,935

(22) Filed: Dec. 23, 2022

(65) Prior Publication Data

US 2024/0072709 A1 Feb. 29, 2024

Related U.S. Application Data

(60) Provisional application No. 63/400,808, filed on Aug. 25, 2022.

(51) Int. Cl.
*H02P 27/08* (2006.01)
*H02M 1/12* (2006.01)
*H02M 1/14* (2006.01)
*H02M 7/5395* (2006.01)

(52) U.S. Cl.
CPC ............ *H02P 27/08* (2013.01); *H02M 1/123* (2021.05); *H02M 1/143* (2013.01); *H02M 7/5395* (2013.01)

(58) Field of Classification Search
CPC ....... H02P 27/08; H02M 1/123; H02M 1/143; H02M 7/5395
See application file for complete search history.

(56) References Cited

U.S. PATENT DOCUMENTS

| | | | | |
|---|---|---|---|---|
| 4,480,301 A | * | 10/1984 | Pfaff | H02M 7/529 363/160 |
| 8,754,603 B2 | * | 6/2014 | Arnett | H02P 21/36 318/434 |
| 10,137,790 B2 | * | 11/2018 | Wang | B60L 50/15 |
| 10,812,006 B2 | * | 10/2020 | Huang | H02P 27/08 |

* cited by examiner

*Primary Examiner* — Thai T Dinh
(74) *Attorney, Agent, or Firm* — Quinn IP Law

(57) ABSTRACT

The concepts described herein provide a method, apparatus, and system for controlling an inverter by modifying duty cycles of the PWM control signals in a manner that achieves a minimum duration between consecutive switching events in the inverter, which serves to reduce common mode current in the bearing(s) of an attached rotary electric machine. To minimize the effect of additional current and voltage ripple into the system, the minimum switching duration is defined in relation to a modulation index and geometric location near the sector boundaries of the respective inverter voltage space vector diagram.

20 Claims, 12 Drawing Sheets

METHOD AND SYSTEM FOR CONTROLLING AN ELECTRIC MACHINE

CROSS-REFERENCE TO RELATED APPLICATIONS

This application claims the benefit of U.S. Provisional Patent Application No. 63/400,808, filed on Aug. 25, 2022, the disclosure of which is hereby incorporated by reference.

INTRODUCTION

In a multi-phase rotary electric machine, traction torque or reactive torque may be generated by multiple alternating current (AC) waveforms that pass through three or more phase leads. The multiple AC waveforms operate at the same frequency and amplitude, but with a time offset or phase shift between the different phases. In a vehicle or other system using an electric machine, a power inverter generates phased AC waveforms that are transferred to individual stator windings of the electric machine to induce a changing magnetic field. This magnetic field causes the rotation of a rotor to occur, which in turn provides motor output torque or regenerative torque. The motor output torque may be harnessed and directed to perform useful work, e.g., propelling the vehicle.

Under some operating conditions, common mode electrical power may be transferred through bearings of the electric machine, which lead to deterioration of the bearings in the form of fluting, pitting, or other effects. This deterioration of the bearings may cause issues related to noise and vibration, may lead to a bearing fault requiring service, and/or may decrease a service life of the electric machine.

SUMMARY

There is a need for a rotary electric machine and an associated inverter and control system that are capable of adjusting or adapting pulsewidth modulated (PWM) control signals for the inverter under some operating conditions to minimize or eliminate common mode electric current flow through the bearing(s) of the rotary electric machine.

The concepts described herein provide a method, apparatus, and system for controlling an inverter by modifying duty cycles of the PWM control signals in a manner that achieves a minimum duration between consecutive switching events in the inverter, which serves to reduce common mode current in the bearing(s) of an attached rotary electric machine. To minimize the effect of additional current and voltage ripple into the system, the minimum switching duration is defined in relation to a modulation index and the modified duty cycles are determined based on the geometric location near the sector boundaries of the respective inverter voltage space vector diagram.

An aspect of the disclosure includes a control system for a multi-phase rotary electric machine that includes an inverter configured to transfer electric energy between a rechargeable energy storage device (RESS) and the multi-phase rotary electric machine, wherein the inverter is composed of a plurality of power transistors; and a controller, operatively connected to the plurality of power transistors of the inverter. The controller includes an instruction set that is executable to: determine a commanded output from the multi-phase rotary electric machine; determine an initial vector scheme responsive to the commanded output; determine a minimum switching event separation for the plurality of power transistors; determine an adapted vector scheme based upon the minimum switching event separation for the plurality of power transistors and the initial vector scheme; and control the plurality of power transistors of the inverter employing the adapted vector scheme.

Another aspect of the disclosure may include the instruction set being executable to alter pulsewidth modulated (PWM) duty cycles associated with the initial vector scheme based on the minimum switching event separation.

Another aspect of the disclosure may include the instruction set being executable to geometrically clamp pulsewidth modulated (PWM) duty cycles associated with the initial vector scheme based on the minimum switching event separation.

Another aspect of the disclosure may include the instruction set being executable to eliminate one of the plurality of sequentially executed vectors based on the minimum switching event separation.

Another aspect of the disclosure may include the instruction set being executable to eliminate one of the plurality of sequentially executed vectors and extend a duration of a remaining one of the plurality of sequentially executed vectors based on the minimum switching event separation.

Another aspect of the disclosure may include the instruction set being executable to decrease a duration of one of the plurality of sequentially executed vectors and extend a duration of a remaining one of the plurality of sequentially executed vectors based on the minimum switching event separation.

Another aspect of the disclosure may include the adapted voltage vector being converted to an adapted PWM duty cycle, wherein the adapted PWM duty cycle includes the minimum switching event separation for the plurality of power transistors.

Another aspect of the disclosure may include the minimum switching event separation for the plurality of power transistors being a minimum duration between a first switching event and a second switching event for the plurality of power transistors, wherein the minimum duration is a time period that enables attenuation of a line-to-line voltage oscillation induced by the first switching event prior to initiation of the second switching event.

Another aspect of the disclosure may include the minimum duration being a time period that enables greater than 99% attenuation of a line-to-line voltage oscillation induced by the first switching event prior to initiation of the second switching event.

Another aspect of the disclosure may include the commanded output of the rotary electric machine being a magnitude of rotational speed and a magnitude of torque.

Another aspect of the disclosure may include a control system for a multi-phase rotary electric machine that includes an inverter configured to transfer electric energy between a rechargeable energy storage device (RESS) and the multi-phase rotary electric machine, wherein the inverter is composed of a plurality of power transistors; and
  a controller, operatively connected to the plurality of power transistors of the inverter. The controller includes an instruction set that is executable to: determine a minimum switching event separation for the plurality of power transistors; determine an adapted vector scheme based upon the minimum switching event separation for the plurality of power transistors; and control the plurality of power transistors of the inverter employing the adapted vector scheme.

Another aspect of the disclosure may include a method for controlling an inverter configured to transfer electric energy to a multi-phase rotary electric machine, wherein the inverter is composed of a plurality of power transistors that includes determining a commanded output from the multi-phase rotary electric machine; determining an initial vector scheme responsive to the commanded output; determining a minimum switching event separation for the plurality of power transistors; determining an adapted vector scheme based upon the minimum switching event separation for the plurality of power transistors and the initial vector scheme; and controlling the plurality of power transistors of the inverter employing the adapted vector scheme.

This operation serves to preserve amplitude of the voltage vector while changing the phase of the voltage vector to eliminate or reduce distortion that is otherwise induced by close-coupled switching events, thus reducing or eliminating common mode current through a rotor bearing of the multi-phase rotary electric machine.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which:

FIGS. 5, 6, 7, 8, 9, 10, 11, 12 and 13 pictorially illustrate aspects of operation of a common mode current attenuation control routine, in accordance with the disclosure.

FIG. 5 schematically illustrates a common mode current attenuation control routine for controlling an embodiment of an inverter for a multi-phase rotary electric machine, in accordance with the disclosure.

Figure 1:
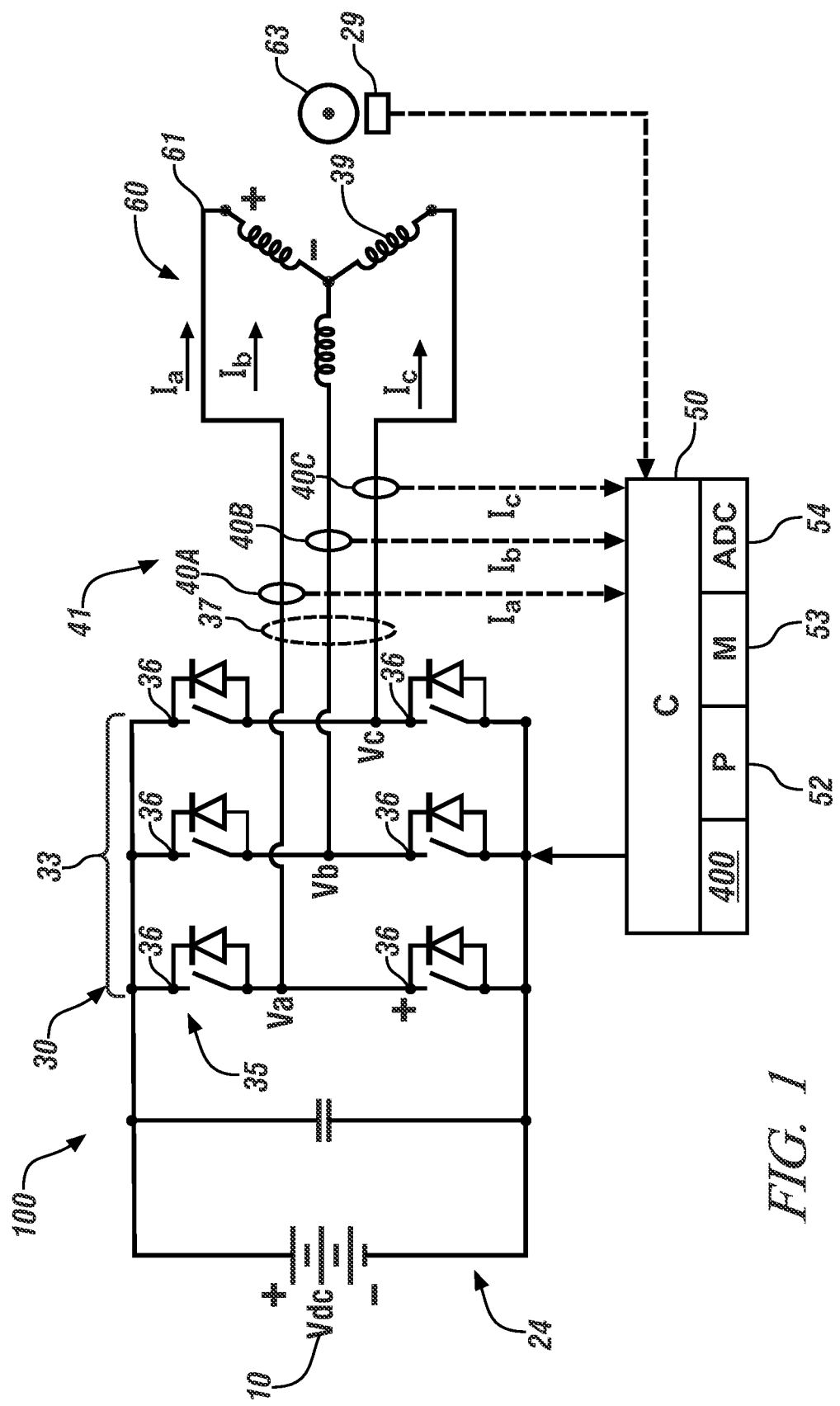
FIG. 1 schematically illustrates a multi-phase rotary electric machine and control system, in accordance with the disclosure.

The appended drawings may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description to provide a thorough understanding of the embodiments disclosed herein, some embodiments can be practiced without some of these details. Moreover, for the purpose of clarity, some technical material that is understood in the related art has not been described in detail to avoid unnecessarily obscuring the disclosure.

Furthermore, the drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. Throughout the drawings, corresponding reference numerals indicate like or corresponding parts and features.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Exemplary embodiments may be described herein in terms of functional and/or logical block components and various processing steps. Such block components may be realized by a combination or collection of mechanical and electrical hardware, software, and/or firmware components configured to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the exemplary embodiments may be practiced in conjunction with other mechanical and/or electronic systems, and that the vehicle systems described herein are merely exemplary embodiment of possible implementations.

The use of ordinals such as first, second and third does not necessarily imply a ranked sense of order, but rather may distinguish between multiple instances of an act or structure.

Figure 2:
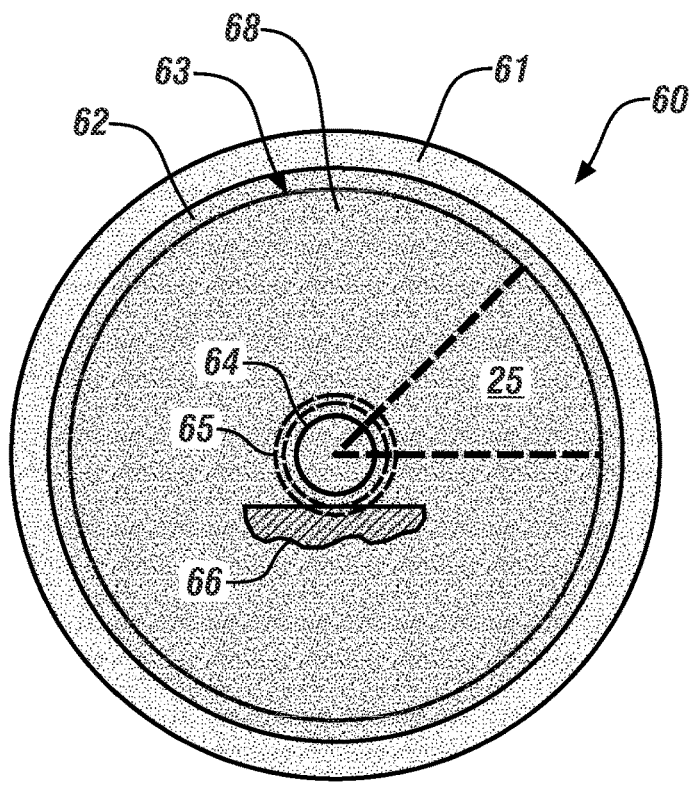
FIG. 2 schematically illustrates a cutaway end view of a rotary electric machine including a rotor and a stator, in accordance with the disclosure.

Referring to the drawings, wherein like reference numerals correspond to like or similar components throughout the several Figures, FIGS. 1 and 2, consistent with embodiments disclosed herein, illustrate a non-limiting example of a multi-phase motor drive system 100. In one embodiment, the multi-phase motor drive system 100 may be disposed to provide propulsion torque in a vehicle. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The multi-phase motor drive system 100 includes a rechargeable energy storage device (RESS) 10, a multi-phase rotary electric machine (electric machine) 60, an inverter 30, and a controller (C) 50. The inverter 30 transforms DC electric energy from the RESS 10 to AC electric energy that is supplied to phases of the electric machine 60 to generate torque in response to control commands from the controller 50.

In one embodiment, the inverter includes an AC choke filter. In one embodiment, the AC choke filter includes an inductor that is in-line or is placed proximal to output leads 41 between the power switches 35 and the electric machine 60.

The controller 50 is programmed in software and equipped in hardware to execute recorded instructions embodying a common mode current attenuation control routine 400.

The RESS 10 is a rechargeable device, e.g., a multi-cell lithium-ion battery or nickel metal hydride battery.

Elements of the electric machine 60 are described with reference to FIG. 2. FIG. 2 schematically illustrates a cross-sectional end-view of an embodiment of a permanent magnet electric machine 60 including an annular-shaped stator 61 that forms a cylindrically shaped void into which a coaxial rotor 63 is inserted, with an airgap 62 formed between the stator 61 and the rotor 63. The rotor 63 is arranged on a rotatable shaft 64 having ends that extend through apertures formed in endcaps 68 of the stator 61, with mounting 66 and bearings 65 arranged therein. One segment 25 is indicated for purposes of discussion. The shaft 64 defines a longitudinal axis with radial lines extending orthogonal to the longitudinal axis. The stator 61 houses a plurality of electrical windings (shown as elements 39 in FIG. 1) that are circumferentially arranged. The electrical windings are electrically connected to the inverter 30, which is controlled by controller 50 to generate rotating electrical fields that induce magnetic fields adjacent to the rotor 63 and interact with the magnetic field of the permanent magnets to generate mechanical torque in the rotor 63. Rotational position sensor 29 (shown with reference to FIG. 1) is arrangement to monitor position of the rotor 63. The electric machine 60 may be controlled to operate as a torque motor and/or an electric power generator. Details related to a physical configuration of a permanent magnet electric machine 60 are known to those skilled in the art, and thus not described in detail herein.

The inverter 30 is configured as a plurality of power switches 35 that are arranged as a plurality of power switch pairs 33 that electrically connect in series between the positive and negative conductors of a high-voltage DC bus 24, which is connected to the RESS 10. As shown, the electric machine 60 is configured as a three-phase device, and the inverter 30 includes three power switch pairs 33, each of which is connected to one of the phases (a, b, or c) of the electric machine 60. Each of the power switches 35 of the power switch pairs 33 may be an Insulated Gate Bipolar Transistor (IGBT) having a diode arranged in parallel, or another suitable high-voltage switch, e.g., a Field-Effect Transistor (FET) or a Silicon-Carbide (SiC) FET. The controller 50 includes an inverter gate drive circuit having a plurality of gate drives and a controller, wherein the inverter gate drive circuit generates control signals to control activation and deactivation of the power switches 35 in response to the control signals, e.g., pulsewidth modulated (PWM) control signals, which originate from the controller 50. The inverter 30 includes other electrical components including capacitors, resistors and other electrical circuit components to accomplish functions related to electrical noise suppression, load balancing and the like. The terms "power switch" and "power transistor" are employed interchangeably throughout.

The inverter 30 may employ pulsewidth modulating (PWM) control of the IGBTs to convert stored DC electric power originating in the RESS 10 to AC electric power to drive the electric machine 60 to generate torque. Similarly, the inverter 30 converts mechanical power transferred to the electric machine 60 to DC electric power to generate electric energy that is storable in the RESS 10, including as part of a regenerative braking control strategy when employed on-vehicle. The inverter 30 receives motor control commands from the controller 50 and controls inverter states to provide the motor drive and regenerative braking functionality.

Control of AC motor/generators, such as three-phase permanent magnet synchronous rotary electric machines is accomplished using a three-phase pulsewidth modulated (PWM) inverter. A PWM inverter can be controlled in several different operating modes, including, e.g., a linear modulation mode and an over-modulation mode. One example of a linear modulation mode of operation is a space vector PWM (SVPWM) mode with linear modulation, e.g., up to 90% of a six-step operation, and one example of an over-modulation mode is a full six-step mode.

Each of the power switches 35 has a first temperature sensor 36 that is arranged to monitor temperature at or near a P-N junction thereof, and is in communication with the controller 50. Each of the first temperature sensors 36 may be a thermistor in one embodiment. Alternatively, the first temperature sensors 36 may be thermocouple junctions or other temperature monitoring devices, without limitation.

The phase currents delivered to the rotary electric machine 60 are individually and separately measured via phase current sensors 40A, 40B, 40C using a measurement process. The phase current sensors 40A, 40B, 40C may be Hall effect sensors in one embodiment.

The controller 50 includes a processor (P) 52 and tangible, non-transitory memory (M) 53 on which is recorded instructions embodying the common mode current attenuation control routine 400. The controller 50 may also include an analog-to-digital converter (ADC) 54. The ADC 54 may be embodied as an electrical circuit providing a specific sampling rate which provides quantization of the continuous/analog voltage input and outputs a representative digital signal. The memory 53 may include read-only memory (ROM), flash memory, optical memory, additional magnetic memory, etc., as well as random access memory (RAM), electrically programmable read-only memory (EPROM), a high-speed clock, analog-to-digital (A/D) and/or digital-to-analog (D/A) circuitry, input/output circuitry or devices, and signal conditioning and buffer circuitry.

The controller 50 commands or causes the inverter 30 to generate a set of pulsewidth modulation signals (arrow PWM). These PWM signals provide switching control of the input voltage used to power the rotary electric machine 60. The controller 50 receives the three measured phase current signals from the phase current sensors 40A, 40B, 40C.

Under some operating conditions, the common mode current attenuation control routine 400 operates to reduce or eliminate common mode current through the bearings of the electric machine that are induced by operation of the inverter by adjusting a phase of a motor control command while maintaining amplitude of the motor control command.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices. The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and similar signals that are capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

Figure 3:
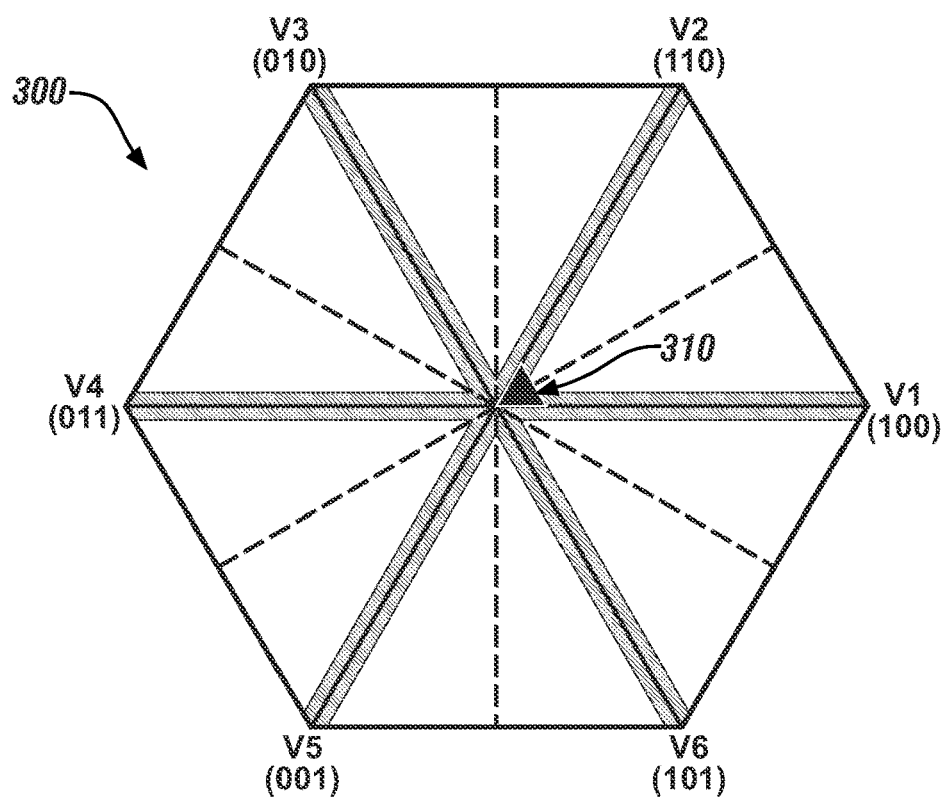
FIG. 3 schematically illustrates an inverter voltage hexagon associated with controlling an embodiment of an inverter for a multi-phase rotary electric machine, in accordance with the disclosure.

FIG. 3 schematically illustrates an inverter voltage hexagon 300 associated with controlling an embodiment of the inverter 30 for the rotary electric machine 60 that is described with reference to FIGS. 1 and 2. The inverter voltage hexagon 300 is a pictorial depiction of a pulsewidth modulation (PWM) scheme that may be employed to supply a voltage vector to a three-phase electric machine, e.g., the rotary electric machine 60. Individual active voltage vectors and associated switch states are indicated, including active vectors V1 (100), V2 (110), V3 (010), V4 (011), V5 (001), and V6 (101). A sector portion 310 of one of the sectors between active vectors V1 (100) and V2 (110) is indicated, with additional detail provided in FIG. 4.

Figure 4:
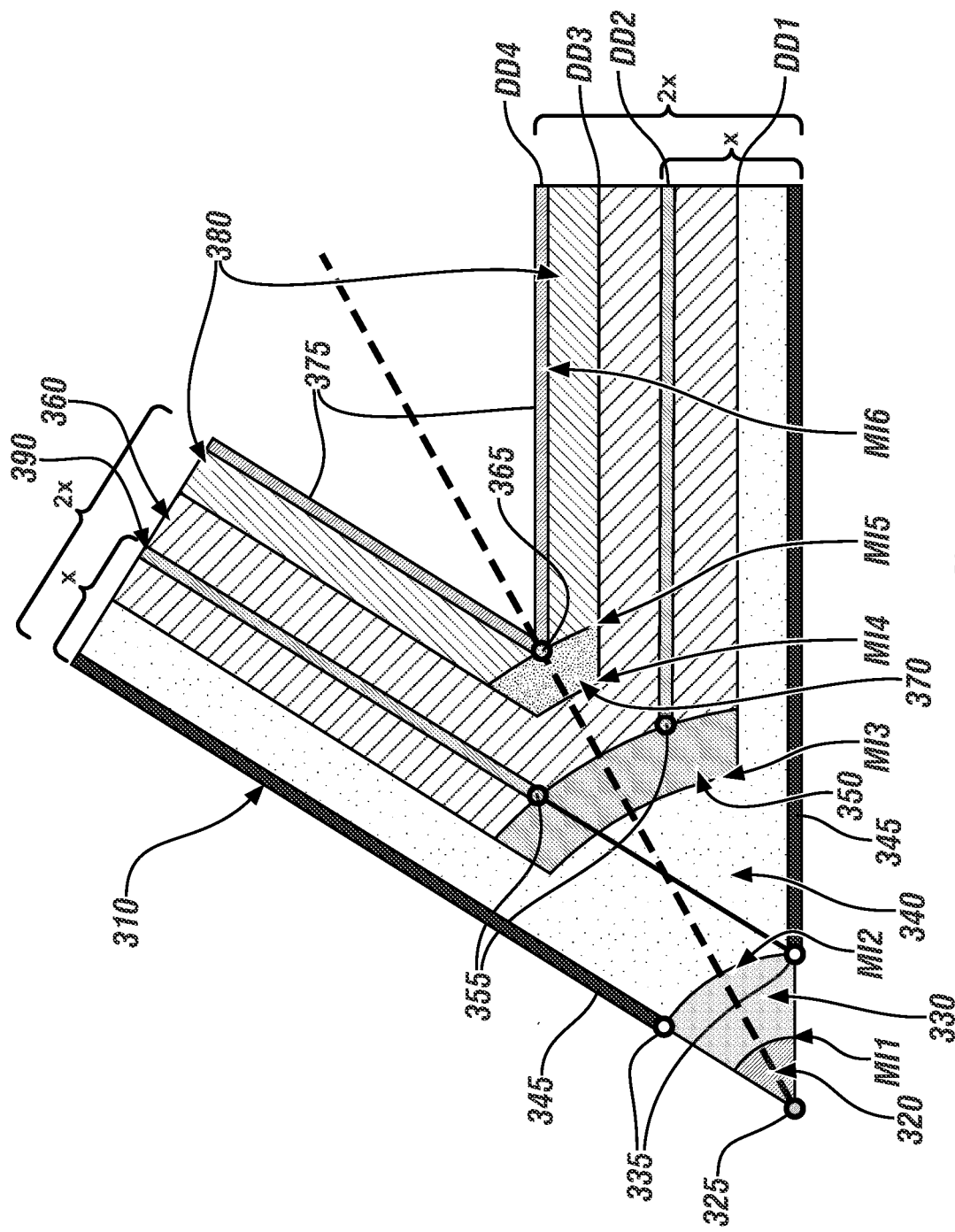
FIG. 4 schematically illustrates one sector of an inverter voltage hexagon for controlling an embodiment of an inverter for a multi-phase rotary electric machine, in accordance with the disclosure.

FIG. 4 schematically illustrates the sector portion 310 of one of the sectors of the inverter voltage hexagon 300 for controlling an embodiment of the inverter 30 for the rotary electric machine 60 that is described with reference to FIGS. 1 and 2. It is appreciated that the sector portion 310 of the specific sector between active vectors V1 (100) and V2 (110) is for purposes of illustration, and that the concepts described herein apply to all of the sectors of inverter voltage hexagon 300 for controlling an embodiment of the inverter 30.

The sector portion 310 of the specific sector relates to an area of operation of the inverter 30 at which the common mode current may be elevated, and thus benefit from control, such as may be provided by operation of the common mode current attenuation control routine 400 described herein.

The sector portion 310 may be advantageously subdivided into a plurality of regions, including first region 320, second region 330, third region 340, fourth region 350, fifth region 360, and sixth region 370. The plurality of regions are defined and circumscribed by a plurality of modulation index (MI) thresholds and a plurality of duty cycle difference (DD) thresholds. The plurality of MI thresholds progressively increase in magnitude, and include first MI threshold MI1, second MI threshold MI2, third MI threshold MI3, fourth MI threshold MI4, fifth MI threshold MI5, and sixth MI threshold MI6. The plurality of DD thresholds progressively increase in magnitude, and include first DD threshold DD1, second DD threshold DD2, third DD threshold DD3, and fourth DD threshold DD4. Also indicated is a minimum length of a null vector or the active voltage vector in relation to the MI.

Also indicated are a plurality of vector clamps for the plurality of regions, including first clamp 325 for the first region 320, second clamp 335 for the second region 330, third clamp 345 for the third region 340, fourth clamp 355 for the fourth region 350, fifth clamp 390 for the fifth region 360, and sixth clamp 365 for the sixth region 370. Also indicated are the seventh region 375 and the eighth region 390. The plurality of vector clamps are employed by the common mode current attenuation control routine 400.

Control of AC motor/generators, such as three-phase permanent magnet synchronous electric motors (electric machines) is accomplished using a three-phase pulsewidth modulated (PWM) inverter. A PWM inverter can be controlled in several different operating modes, including, e.g., a linear modulation mode and an over-modulation mode. One example of a linear modulation mode of operation is a space vector PWM (SVPWM) mode with linear modulation, e.g., up to 90% of a six-step operation, and one example of an over-modulation mode is a full six-step mode.

The common mode current attenuation control routine 400 described with reference to FIGS. 5, et seq., operates to adapt the control of some inverter switching events to meet a minimum duration between consecutive switching events to reduce the magnitude of the bearing current spikes in the common mode current through the bearing(s) of the rotary electric machine 60. This may serve to reduce bearing wear and extend bearing service life.

This may include modifying the PWM duty cycle to reduce the magnitude and occurrence of the common mode current spikes to reduce AC choke temperature.

This may include modifying the minimum duration between consecutive switching events (e.g., the length of null or active voltage vector) based on a Modulation Index (MI) with a hysteresis band to minimize current/voltage disturbance in the system at low MIs.

This may include maintaining the magnitude of the voltage vector to reduce the disturbance in the system by rotating the voltage vector to the closest active vector.

This may include geometrically clamping the duty cycles based on the initial voltage vector to the nearest combination that meets a minimum switching event separation constraints. This may be specifically achieved by determining the starting null vector (000 or 111) based on the angle of the voltage vector in the inverter voltage hexagon; determining the active vector (100, 101, 110, 010, 011, 001) based on the angle of the voltage vector in the inverter voltage hexagon; modifying the PWM duty cycle to clamp to the null vector or to the minimum active voltage vector to minimize the change in magnitude and angle of the voltage vector; modifying the PWM duty cycle to maintain the magnitude of the voltage vector but rotate to the closest active voltage vector; and modifying the PWM duty cycles to meet the minimum modified double active vector clamp by eliminating a switching event to minimize the change in magnitude and angle of the voltage vector. When the control routine includes space vector modulation (SVPWM), there is one of the two operating points or lines in every 60-degree sector due to center aligned PWM that starts with the 000 (Null) vector. If the PWM waveform is generated using the inverted center align the useable and non-useable points/lines are flipped.

This may include modifying the PWM duty cycles to meet the double active vector clamp without eliminating a switching event to minimize the change in magnitude and angle of the voltage vector.

This may include determining the PWM duty cycles that do not allow the minimum spacing between the switching events and equally modifying the related duty cycles to reduce the change in inverter voltage vector.

In this manner, the common mode current attenuation control routine 400 preserves the amplitude of the initial vector while changing the phase of the initial vector to eliminate or reduce distortion that is otherwise induced by close-coupled switching events, and thus reduce or eliminate common mode current through a rotor bearing, and modify the duty cycles to the closest operable point that does not violate the minimum switching distance. In so doing, the magnitude of the vector is maintained by modifying the angle by dropping a vector (active or null) to reduce the disturbance in the system.

Figure 5:
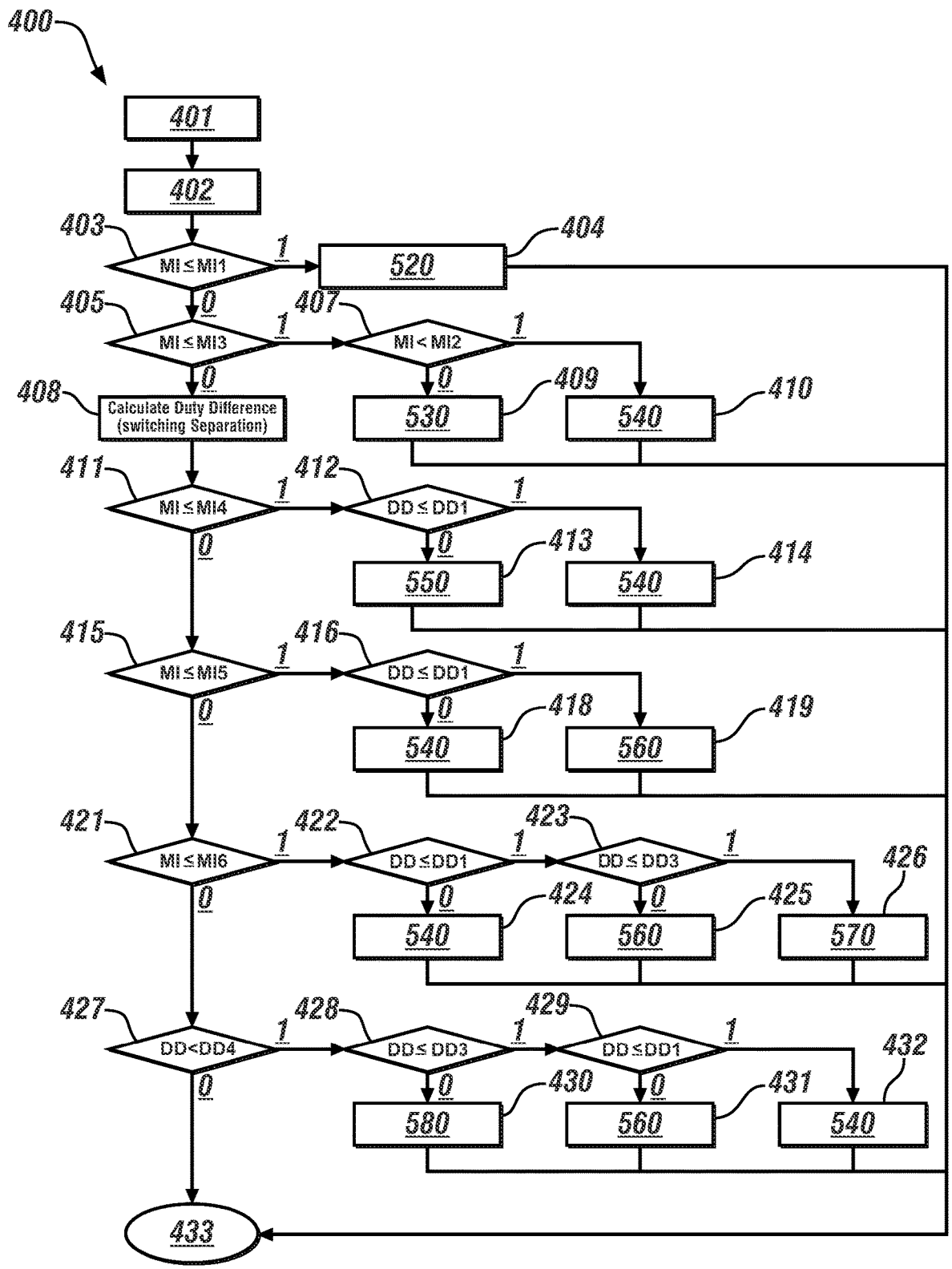

FIG. 5 schematically illustrates an embodiment of elements of the common mode current attenuation control routine 400 for controlling an embodiment of the inverter 30 for the electric machine 60 that is described with reference to FIGS. 1 and 2. The common mode current attenuation control routine 400 is executed as one or more algorithms that are stored and/or executed in the controller 50 in the form of instruction sets. As employed herein, the term "1" indicates an answer in the affirmative, or "YES" or "TRUE", and the term "0" indicates an answer in the negative, or "NO" or "FALSE".

Overall, the common mode current attenuation control routine 400 determines a commanded torque or power output from the electric machine (Step 401) and determines an initial voltage vector (Initial Vector) responsive to the commanded output (Step 402). The initial voltage vector is a space vector having a magnitude and an angle that defines a modulation index (MI). The space vector is employed to define pulsewidths for the plurality of power switch pairs 33 of the inverter.

The remaining steps (i.e., Steps 403, et seq.) of the common mode current attenuation control routine 400 include determining a magnitude of the MI for the initial voltage vector (Initial Vector) and determining an adapted voltage vector (Adapted Vector) based upon a minimum switching event separation for the plurality of power transistors. Operation of the plurality of power transistors of the inverter is controlled employing the adapted voltage vector.

The minimum switching event separation for the plurality of power transistors is a minimum duration between a first switching event and an immediately subsequent second switching event for the plurality of power transistors. The minimum duration is a time period that enables attenuation of a line-to-line voltage oscillation that is induced by the first switching event prior to initiating the second switching event. In one embodiment, the attenuation of the line-to-line voltage oscillation that is induced by the first switching event is a 90% attenuation. In one embodiment, the attenuation of the line-to-line voltage oscillation that is induced by the first switching event is a 99% attenuation. In one embodiment, the attenuation of the line-to-line voltage oscillation that is induced by the first switching event is a 100% attenuation. Other magnitudes of attenuation of the line-to-line voltage oscillation induced by the first switching event may instead be employed.

Following on, the MI is compared to the first MI threshold MI1 (Step 403). When the MI is less than or equal to the first MI threshold MI1 (1), a null vector clamp algorithm 520 is executed to determine the adapted voltage vector (Step 404), and the adapted voltage vector is employed to control the plurality of power transistors 35 of the inverter 30 this iteration (Step 433). Details related to the null vector clamp algorithm 520 are described with reference to FIGS. 6A, 6B, and 6C.

When the MI is greater than the first MI threshold MI1 (0), the MI is compared to the third MI threshold MI3 (Step 405). When the MI is less than or equal to the third MI threshold MI3 (1), the MI is compared to the second MI threshold MI2 (Step 407).

When the MI is less than or equal to the second MI threshold MI2 (0), a minimum single active vector clamp routine 530 is executed to determine the adapted voltage vector (Step 409), and the adapted voltage vector is employed to control the plurality of power transistors 35 of the inverter 30 this iteration (Step 433). Details related to the minimum single active vector clamp routine 530 are described with reference to FIGS. 7A, 7B, and 7C.

When the MI is greater than the second MI threshold MI2 (1), a single active vector clamp routine 540 is executed to determine the adapted voltage vector (Step 410), and the adapted voltage vector is employed to control the plurality of power transistors 35 of the inverter 30 this iteration (Step 433). Details related to the single active vector clamp routine 540 are described with reference to FIGS. FIGS. 8A, 8B, and 8C.

When the MI is greater than the third MI threshold MI3 (0), a duty cycle difference (DD) is calculated to determine switching separation (Step 408), and the MI is compared to the fourth MI threshold MI4 (Step 411).

When the MI is less than or equal to the fourth MI threshold MI4 (1), the duty cycle difference DD is compared to the first DD threshold (DD1) (Step 412).

When the duty cycle difference DD is greater than the first DD threshold (DD1) (0), a minimum modified double active vector clamp routine 550 is executed to determine the adapted voltage vector (Step 413), and the adapted voltage vector is employed to control the plurality of power transistors 35 of the inverter 30 this iteration (Step 433). Details related to the minimum modified double active vector clamp routine 550 are described with reference to FIGS. 9A, 9B, and 9C.

When the duty cycle difference DD is less than or equal to the first DD threshold (DD1) (1), the single active vector clamp routine 540 is executed to determine the adapted voltage vector (Step 414), and the adapted voltage vector is employed to control the plurality of power transistors 35 of the inverter 30 this iteration (Step 433).

When the MI is greater than the fourth MI threshold MI3 (0), the MI is compared to the fifth MI threshold MI5 (Step 415).

When the MI is less than or equal to the fifth MI threshold MI5 (1), the duty cycle difference DD is compared to a first DD threshold (DD1) (Step 416).

When the duty cycle difference DD is greater than the first DD threshold (DD1) (0), the modified double active vector clamp routine 560 is executed to determine the adapted voltage vector (Step 419), and the adapted voltage vector is employed to control the plurality of power transistors 35 of the inverter 30 this iteration (Step 433). Details related to the modified double active vector clamp routine 560 are described with reference to FIGS. 10A, 10B, and 10C.

When the duty cycle difference DD is less than or equal to the first DD threshold (DD1) (1), the single active vector clamp routine 540 is executed to determine the adapted voltage vector (Step 418), and the adapted voltage vector is employed to control the plurality of power transistors 35 of the inverter 30 this iteration (Step 433).

When the MI is greater than the fifth MI threshold MI5 (0), the modulation index MI is compared to the sixth MI threshold MI6 (Step 421).

When the MI is less than or equal to the sixth MI threshold MI6 (1), the duty cycle difference DD is compared to the first DD threshold (DD1) (Step 422).

When the duty cycle difference DD is less than or equal to the first DD threshold (DD1) (0), the single active vector clamp routine 540 is executed to determine the adapted voltage vector (Step 424), and the adapted voltage vector is employed to control the plurality of power transistors 35 of the inverter 30 this iteration (Step 433).

When the duty cycle difference DD is greater than the first DD threshold (DD1) (1), the duty cycle difference DD is compared to the third DD threshold (DD3) (Step 423).

When the duty cycle difference DD is less than or equal to the third DD threshold (DD3) (0), the modified double active vector clamp routine 550 is executed to determine the adapted voltage vector (Step 425), and the adapted voltage vector is employed to control the plurality of power transistors 35 of the inverter 30 this iteration (Step 433).

When the duty cycle difference DD is greater than the third DD threshold (DD3) (1), a minimum double active vector clamp routine 570 is executed to determine the adapted voltage vector (Step 426), and the adapted voltage vector is employed to control the plurality of power transistors 35 of the inverter 30 this iteration (Step 433). Details related to the minimum double active vector clamp routine 570 are described with reference to FIGS. 11A, 11B, and 11C.

When the MI is greater than the sixth MI threshold MI6 (421)(0), the duty cycle difference DD is compared to the fourth DD threshold (DD4) (Step 427).

When the duty cycle difference DD is less than the fourth DD threshold (DD4) (1), the duty cycle difference DD is compared to the third DD threshold (DD3) (Step 428).

When the duty cycle difference DD is greater than the third DD threshold (DD3) (0), a double active vector clamp routine 580 is executed to determine the adapted voltage vector (Step 430), and the adapted voltage vector is employed to control the plurality of power transistors 35 of the inverter 30 this iteration (Step 433). Details related to the double active vector clamp routine 580 are described with reference to FIGS. 12A, 12B, and 12C.

When the duty cycle difference DD is less than or equal to the third DD threshold (DD3) (1), the duty cycle difference DD is compared to the first DD threshold (DD1) (Step 429).

When the duty cycle difference DD is greater than the first DD threshold (DD1) (0), the modified double active vector clamp routine 560 is executed to determine the adapted voltage vector (Step 431), and the adapted voltage vector is employed to control the plurality of power transistors 35 of the inverter 30 this iteration (Step 433).

When the duty cycle difference DD is less than or equal to the first DD threshold (DD1) (1), the single active vector clamp routine 540 is executed to determine the adapted voltage vector (Step 432), and the adapted voltage vector is employed to control the plurality of power transistors 35 of the inverter 30 this iteration (Step 433).

Figure 6A:
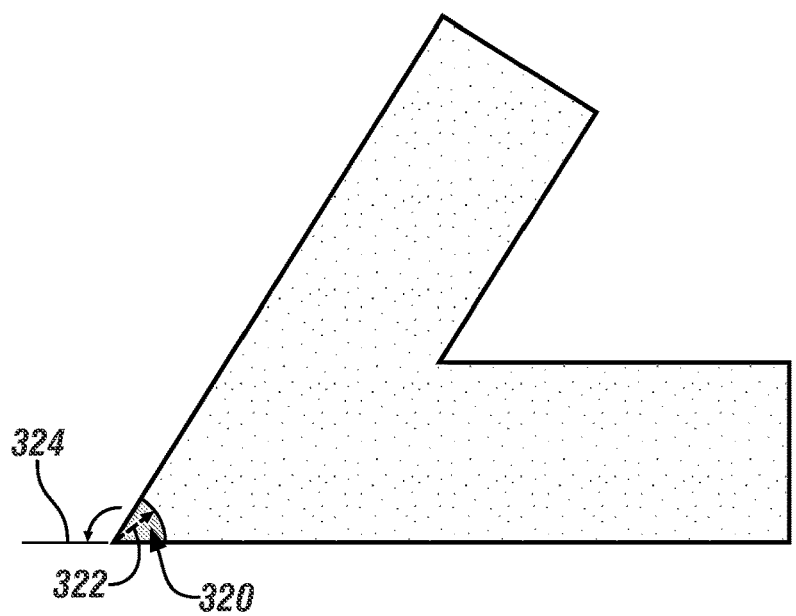
FIGS. 6A, 6B, and 6C illustrate details related to a null vector clamp routine for an embodiment of the common mode current attenuation control routine, in accordance with the disclosure.
Figure 6B:
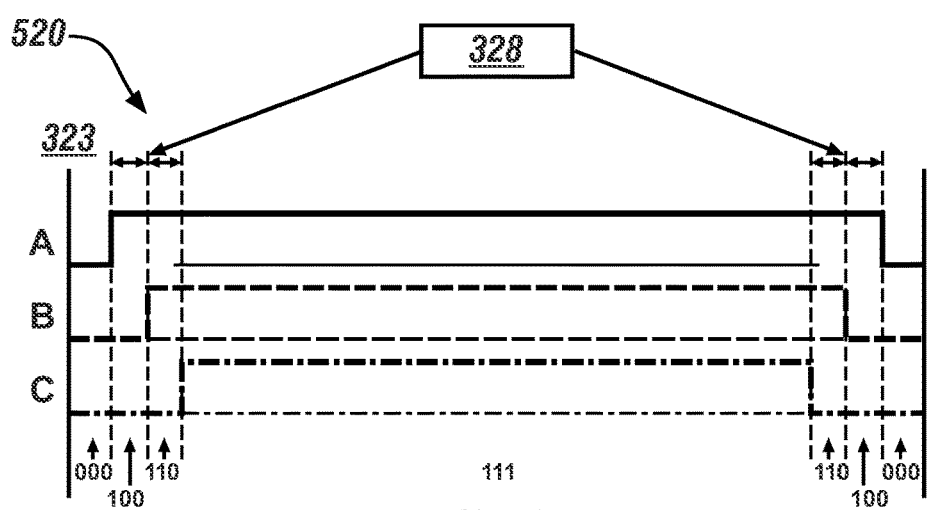
Figure 6C:
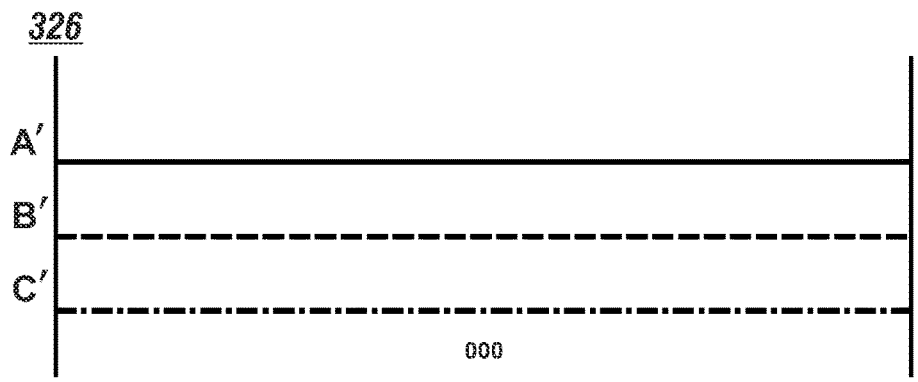

The null vector clamp algorithm 520 is described with reference to FIGS. 6A, 6B, and 6C. FIG. 6A schematically illustrates the first region 320 with initial vector scheme 322 including vectors (000), (100), (110), (111), (110), (100), and (000) being executed sequentially. FIG. 6B graphically illustrates initial switch commands A, B, and C 323 for controlling the plurality of power transistors 35 of the inverter 30 employing the initial vector scheme 322. As indicated by 328, the durations, i.e., elapsed times between the initial switch commands for A and B, and between initial switch commands for B and C are insufficient to attenuate line-to-line voltage oscillation that is induced by the first switching event prior to initiating the second switching event in sequential vectors. Referring again to FIG. 6A, the null vector clamp algorithm 520 commands the adapted vector 324 to be the null vector, i.e., (000), with the adapted vector 324 including adapted PWM switch commands A', B', and C' 326 graphically illustrated with reference to FIG. 6C.

Figure 7A:
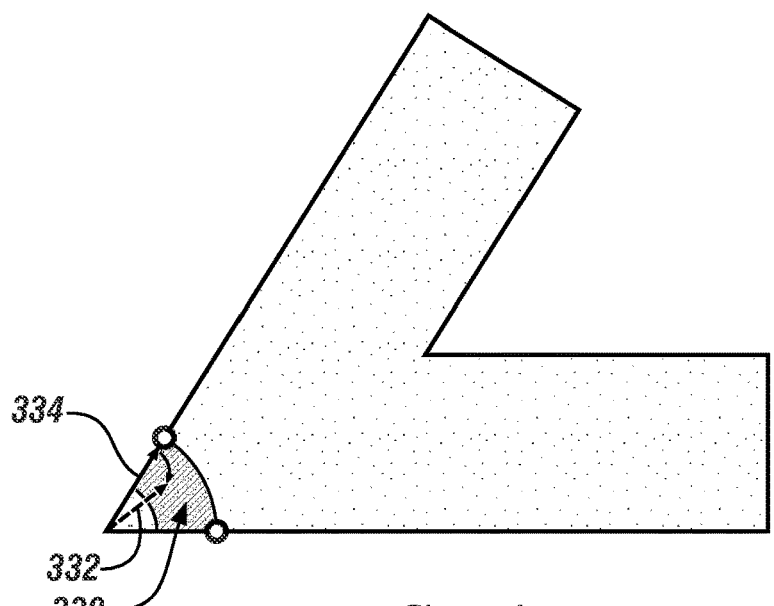
FIGS. 7A, 7B, and 7C illustrate details related to a minimum single active vector clamp routine for an embodiment of the common mode current attenuation control routine, in accordance with the disclosure.
Figure 7B:
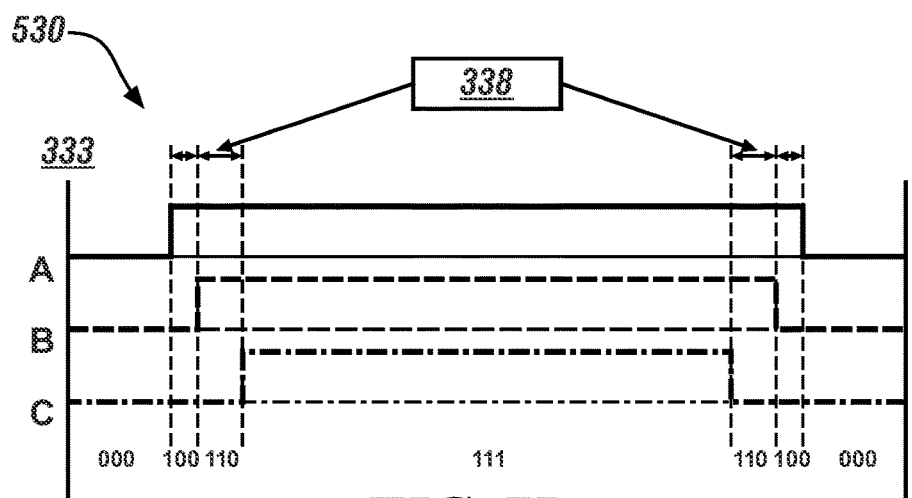
Figure 7C:
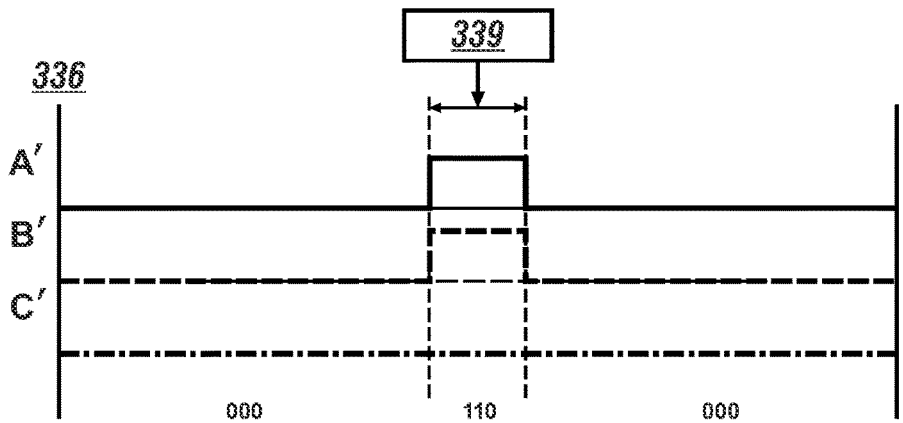

The minimum single active vector clamp routine 530 is described with reference to FIGS. 7A, 7B, and 7C. FIG. 7A schematically illustrates the second region 330 with initial vector scheme 332. FIG. 7B graphically illustrates initial switch commands A, B, and C 333 for controlling the plurality of power transistors 35 of the inverter 30 employing the initial vector scheme 332 including vectors (000), (100), (110), (111), (110), (100), and (000) being executed sequentially in the manner shown. As indicated by 338, the durations, i.e., elapsed times between the initial switch commands for A and B, and between initial switch commands for B and C are insufficient to attenuate line-to-line voltage oscillation that is induced by the first switching event prior to initiating the second switching event in sequential vectors. Referring again to FIG. 7A, the minimum single active vector clamp routine 530 creates the adapted vector 334 by commanding one of the initial vectors to be eliminated, e.g., vector (100), and commands an increase to the magnitude of the other active vector lengths to meet the minimum switching duration. The adapted vector scheme 336 including vectors (000), (110), and (000) and PWM switch commands A', B', and C' 339 being executed sequentially is graphically illustrated with reference to FIG. 7C. If the PWM type is DPWM, the initial null vector is selected based on the sector it falls in within the inverter voltage hexagon. Between (−30)-30, 90-150, 210-270 degrees, the initial vector will start with the (000) null vector. Otherwise, it will start with the (111) null vector. In one embodiment, the angle of the initial vector also determines what active vector is eliminated or kept. By way of example, when the vector angle is between (−30) and 30—active vector 100 is employed, when the vector angle is between 30 and 90, the active vector 110 is employed, when the vector angle is between 90 and 150, the active vector 010 is employed, when the vector angle is between 150 and 210, the active vector 011 is employed, and when the vector angle is between 210 and 270, the active vector 001 is employed, and when the vector angle is between 270 and 330, the active vector 101 is employed.

Figure 8A:
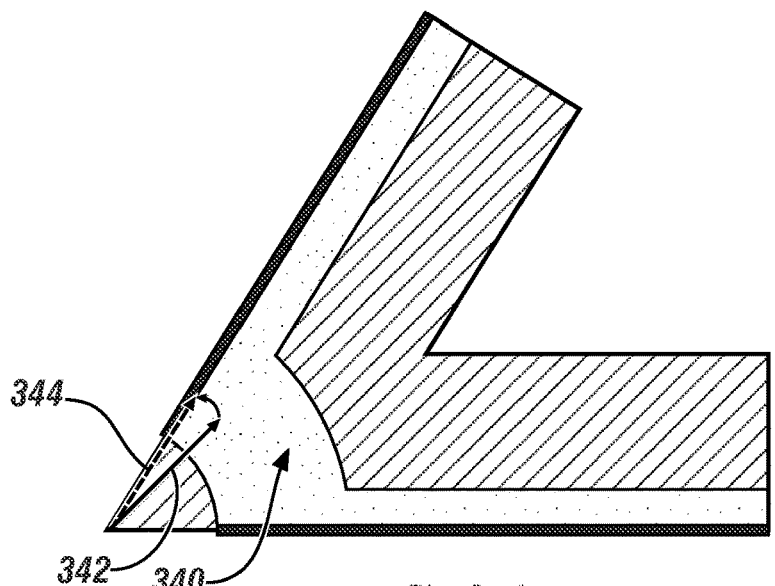
FIGS. 8A, 8B, and 8C illustrate details related to a single active vector clamp routine for an embodiment of the common mode current attenuation control routine, in accordance with the disclosure.
Figure 8B:
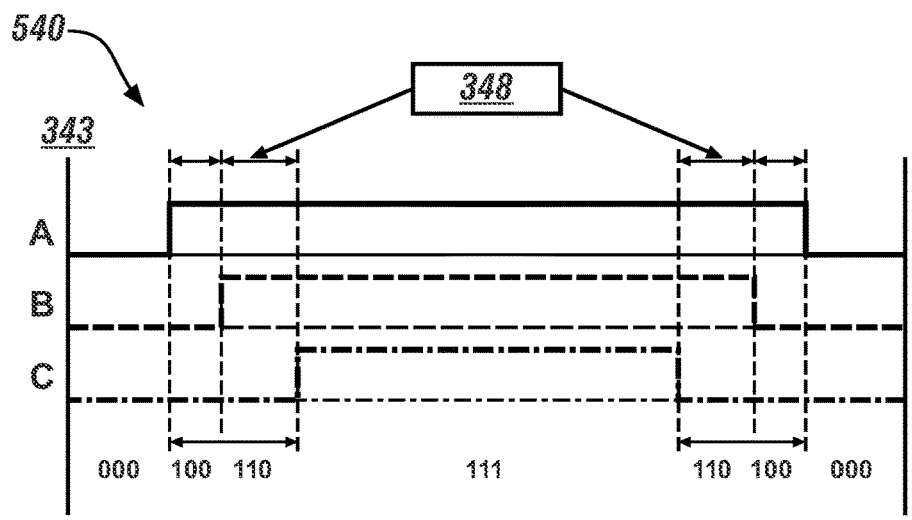
Figure 8C:
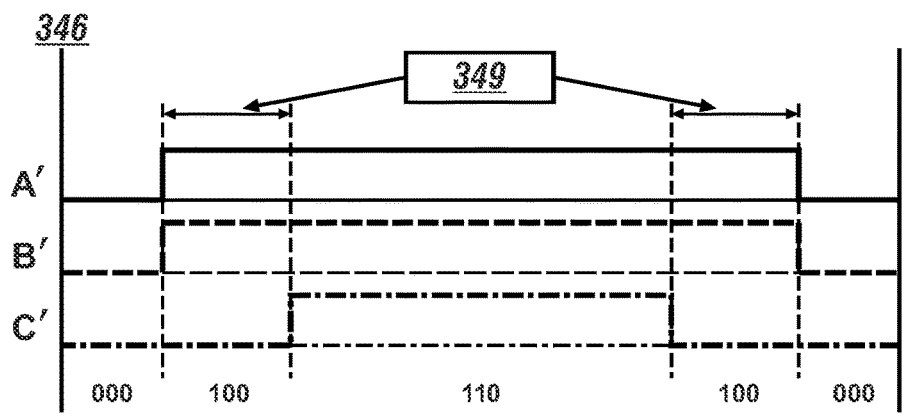

The single active vector clamp routine 540 is described with reference to FIGS. 8A, 8B, and 8C. FIG. 8A schematically illustrates the third region 340 with initial vector scheme 342. FIG. 8B graphically illustrates initial switch commands A, B, and C 343 for controlling the plurality of power transistors 35 of the inverter 30 employing the initial vector scheme 342 including vectors (000), (100), (110), (111), (110), (100), and (000) being executed sequentially in the manner shown. As indicated by 348, the durations, i.e., elapsed time between the initial switch commands for A and B, and between initial switch commands for B and C are insufficient to attenuate line-to-line voltage oscillation that is induced by the first switching event prior to initiating the second switching event in sequential vectors. Referring again to FIG. 8A, the single active vector clamp routine 540 creates the adapted vector 344 by commanding one of the initial vectors to be employed, e.g., vector (100), and commands an increase to the magnitude of the other active vector to maintain the magnitude of the initial voltage vector. Eliminating the active vector is what causes the vector to rotate to one of the vertices. The adapted vector scheme 346 including vectors (000), (110), and (000) and PWM switch commands A', B', and C' 349 being executed sequentially is graphically illustrated with reference to FIG. 8C. In one embodiment, the angle of the initial vector also determines what active vector is eliminated or kept. By way of example. when the vector angle is between (−30) and 30, the active vector 100 is employed, when the vector angle is between 30 and 90, the active vector 110 is employed, when the vector angle is between 90 and 150, the active vector 010 is employed, when the vector angle is between 150 and 210, the active vector 011 is employed, and when the vector angle is between 210 and 270, the active vector 001 is employed, and when the vector angle is between 270 and 330, the active vector 101 is employed. If the PWM type is DPWM, the initial null vector is selected based on the sector it falls in within the inverter voltage hexagon. Between (−30)-30, 90-150, 210-270 degrees, the initial vector will start with the (000) null vector. Otherwise, it will start with the (111) null vector.

Figure 9A:
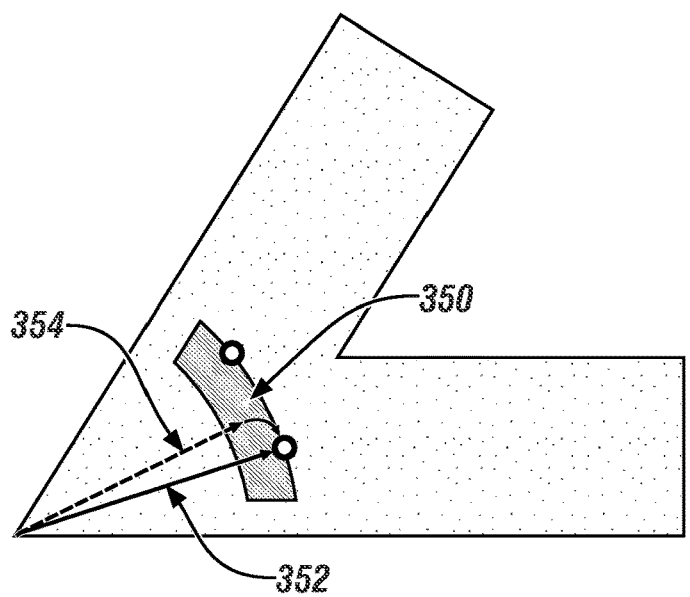
FIGS. 9A, 9B, and 9C illustrate details related to a minimum modified double active vector clamp routine for an embodiment of the common mode current attenuation control routine, in accordance with the disclosure.
Figure 9B:
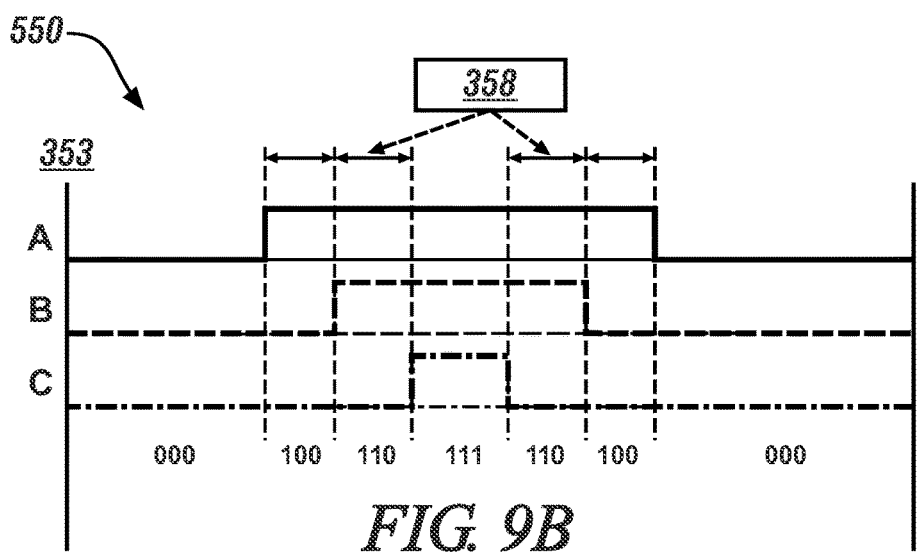
Figure 9C:
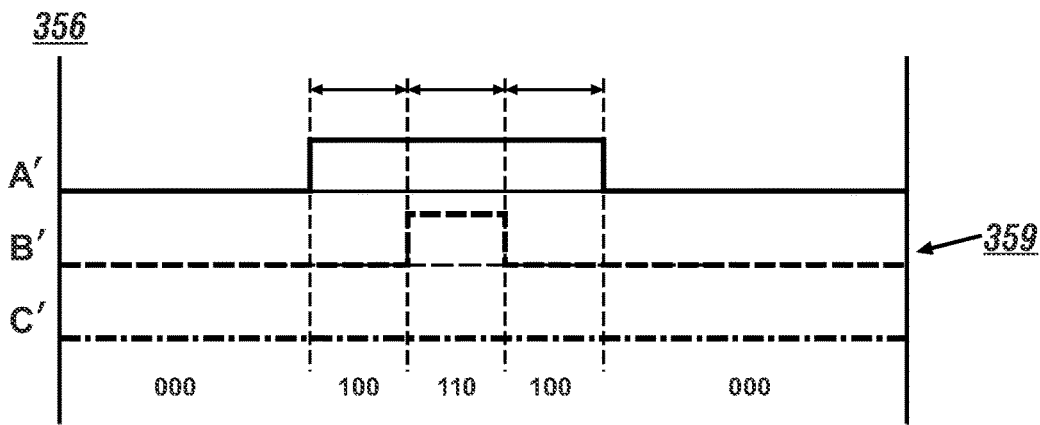

The minimum modified double active vector clamp routine 550 is described with reference to FIGS. 9A, 9B, and 9C. FIG. 9A schematically illustrates the fourth region 350 with initial vector scheme 354. FIG. 9B graphically illustrates initial switch commands A, B, and C 353 for controlling the plurality of power switches 35 of the inverter 30 employing the initial vector scheme 354 including vectors (000), (100), (110), (111), (110), (100), and (000) being executed sequentially in the manner shown. As indicated by 358, the durations, i.e., elapsed times between the initial switch commands for A and B, and between initial switch commands for B and C are insufficient to attenuate line-to-line voltage oscillation that is induced by the first switching event prior to initiating the second switching event in sequential vectors. Referring again to FIG. 9A, the minimum modified double active vector clamp routine 550 creates the adapted vector 352 by eliminating one of the null vectors, e.g., vector (111), and commands one of the active vector lengths to meet the minimum switching duration, and the other to meet twice the minimum switching duration. The adapted vector scheme 352 including vectors (000), (100), (110), (100), and (000) and PWM switch commands A', B', and C' 356 being executed sequentially is graphically illustrated with reference to FIG. 9C. Within the fourth region 350, one of the active vector lengths is increased to meet the minimum switching duration, and the other is increased to meet twice the minimum switching duration. If the PWM type is SVPWM the (111) null vector is eliminated (or the (000) null vector is eliminated for inverted SVPWM). If an area becomes unusable, it will fall to a different region for modification such as the Single Active Vector Clamp or the Double Active Vector Clamp. If the PWM type is DPWM, the initial null vector is selected based on where it falls within the inverter voltage hexagon. Between (−30)-30, 90-150, 210-270 degrees, will start with the 111—null vector, everything else will start with the 000—null vector. The ability to change the starting null vector for DPWM allows for all locations in the inverter voltage hexagon to be available.

Figure 10A:
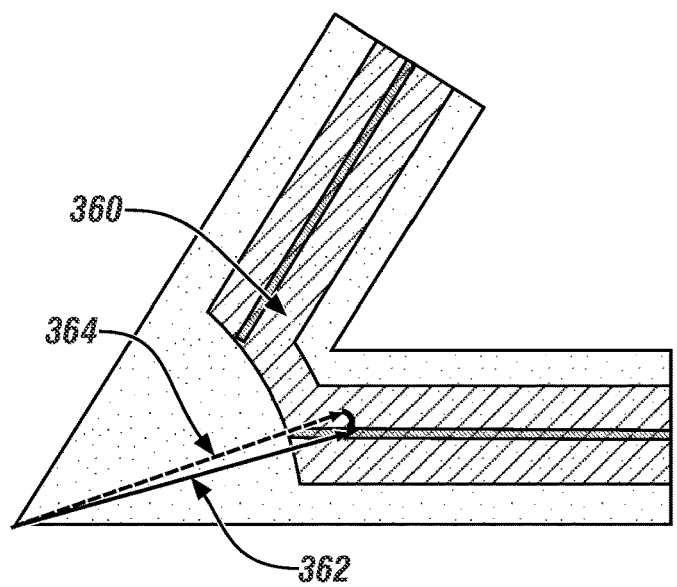
FIGS. 10A, 10B, and 10C illustrate details related to a modified double active vector clamp routine for an embodiment of the common mode current attenuation control routine, in accordance with the disclosure.
Figure 10B:
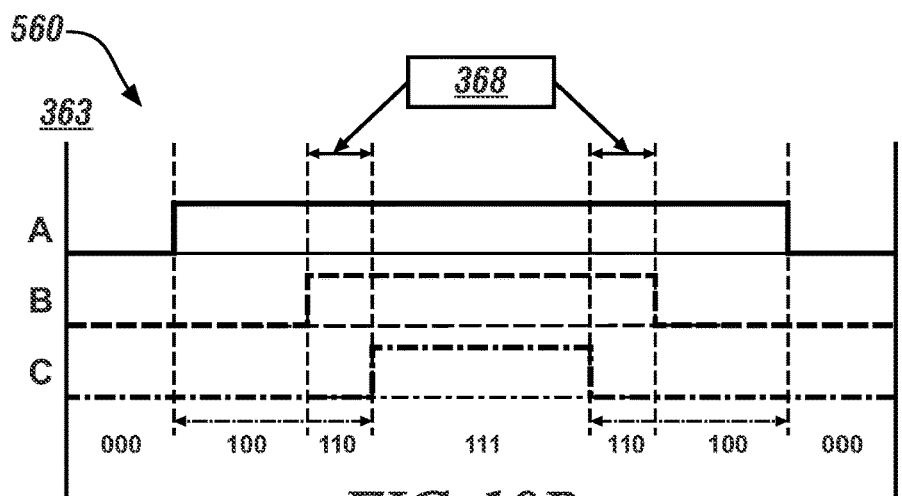
Figure 10C:
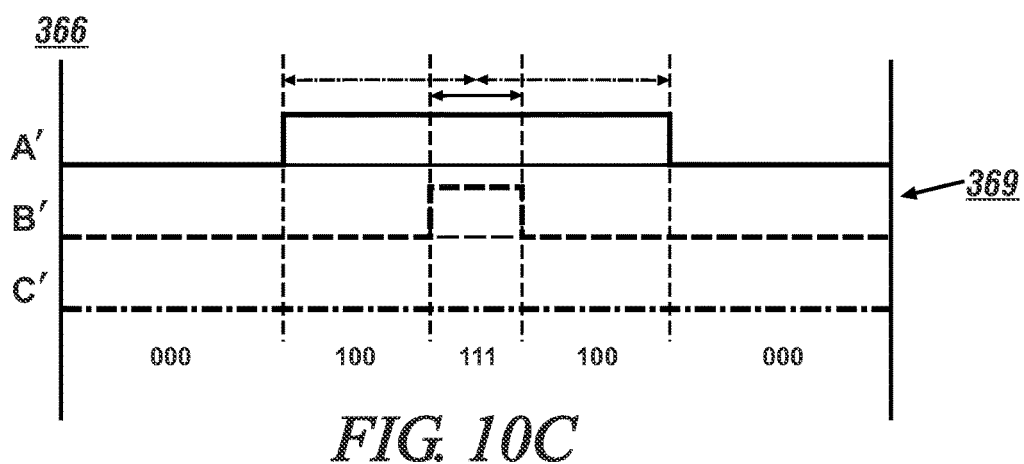

The modified double active vector clamp routine 560 is described with reference to FIGS. 10A, 10B, and 10C. FIG. 10A schematically illustrates the fifth region 360 with initial vector scheme 364. FIG. 10B graphically illustrates initial switch commands A, B, and C 363 for controlling the plurality of power transistors 35 of the inverter 30 employing the initial vector scheme 364 including vectors (000), (100), (110), (111), (110), (100), and (000) being executed sequentially in the manner shown. As indicated by 368, the durations, i.e., elapsed time between the initial switch commands for B and C is insufficient to attenuate line-to-line voltage oscillation that is induced by the first switching event prior to initiating the second switching event in sequential vectors. Referring again to FIG. 10A, the modified double active vector clamp routine 560 creates the adapted vector 362 by eliminating one of the null vectors, e.g., vector (111), and commands one of the active vector lengths to meet the minimum switching duration, the other is modified to maintain the magnitude of the initial voltage vector. The adapted vector scheme 366 including vectors (000), (100), (110), (100), and (000) and PWM switch commands A', B', and C' 369 being executed sequentially is graphically illustrated with reference to FIG. 10C. Within the fifth region 360, one of the active vector lengths is increased or decreased to meet the minimum switching duration, and the other is modified to maintain the magnitude of the initial voltage vector to reduce additional disturbance in the system. If the PWM type is SVPWM the (111) null vector is eliminated (or the (000) null vector is eliminated for inverted SVPWM). If an area becomes unusable, it will fall to a different region for modification such as the Single Active Vector Clamp or the Double Active Vector Clamp. If the PWM type is DPWM, the initial null vector is selected based on where it falls within the inverter voltage hexagon. Between (−30)-30, 90-150, 210-270 degrees, will start with the 111—null vector, everything else will start with the 000—null vector. The ability to change the starting null vector for DPWM allows for all locations in the inverter voltage hexagon to be available.

Figure 11A:
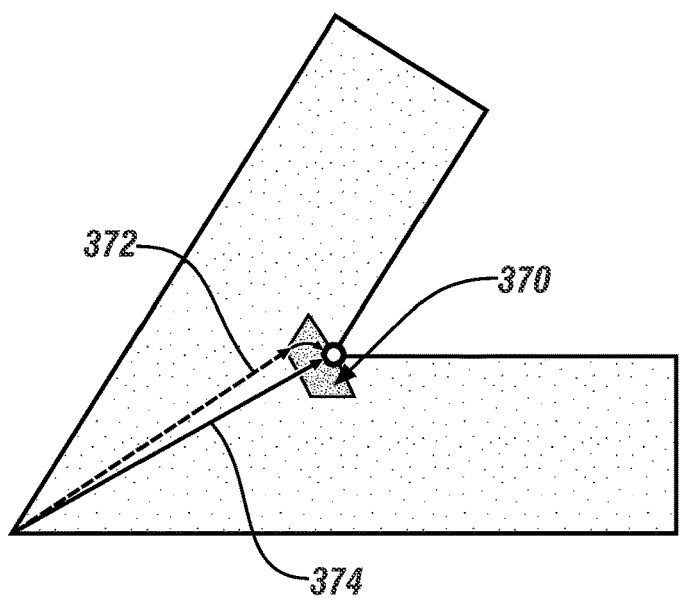
FIGS. 11A, 11B, and 11C illustrate details related to a minimum double active vector clamp routine for an embodiment of the common mode current attenuation control routine, in accordance with the disclosure.
Figure 11B:
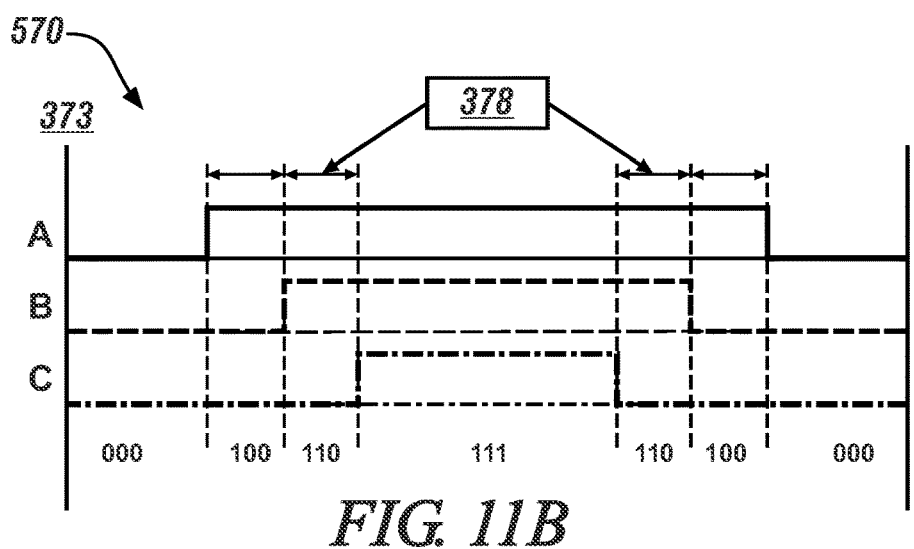
Figure 11C:
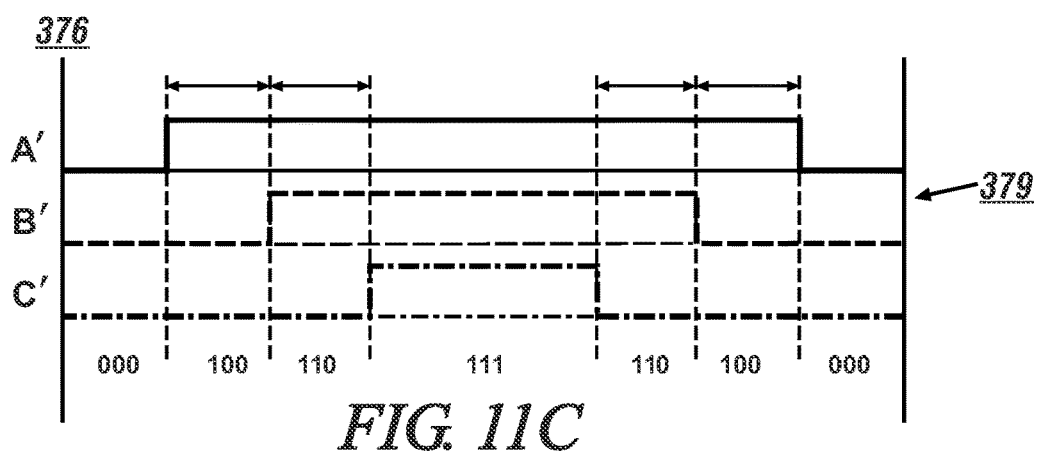

The minimum double active vector clamp routine 570 is described with reference to FIGS. 11A, 11B, and 11C. FIG. 11A schematically illustrates the sixth region 370 with initial vector scheme 372. FIG. 11B graphically illustrates initial switch commands A, B, and C 373 for controlling the plurality of power transistors 35 of the inverter 30 employing the initial vector scheme 372 including vectors (000), (100), (110), (111), (110), (100), and (000) being executed sequentially in the manner shown. As indicated by 378, the durations, i.e., elapsed times between the initial switch commands for A and B, and between initial switch commands for B and C are insufficient to attenuate line-to-line voltage oscillation that is induced by the first switching event prior to initiating the second switching event in sequential vectors. Referring again to FIG. 11A, the minimum double active vector clamp routine 570 creates the adapted vector 374 by extending the durations of initial vectors (100), (110) to meet twice the minimum switching duration, and decreasing the duration of the null vectors (000), (111). The adapted vector scheme 376 including vectors (000), (100), (110), (111), (110), (100), and (000) and PWM switch commands A', B', and C'379 being executed sequentially is graphically illustrated with reference to FIG. 11C. Thus, if the initial vector falls in this region, both active voltage vectors are increased to meet twice the minimum switching. If the PWM type is DPWM, the initial null vector is selected based on where it falls within the inverter voltage hexagon. Between (−30)-30, 90-150, 210-270 degrees, will start with the 000—null vector, everything else will start with the 111—null vector.

Figure 12A:
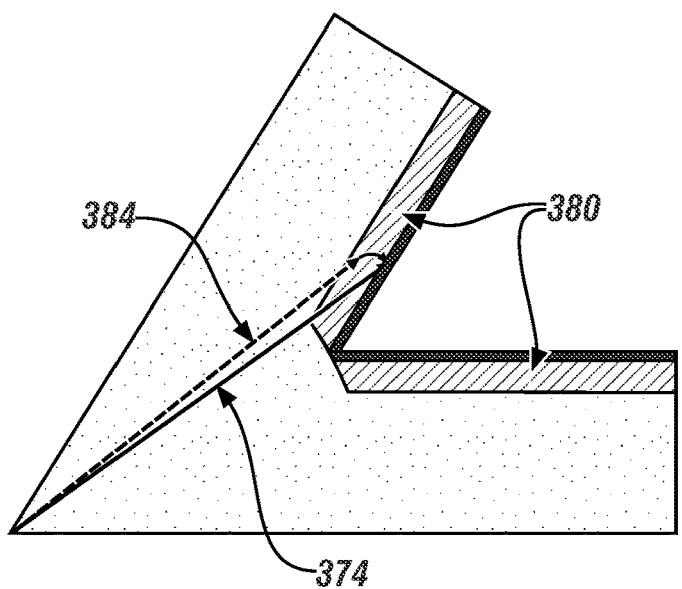
FIGS. 12A, 12B, and 12C illustrate details related to a double active vector clamp routine for an embodiment of the common mode current attenuation control routine, in accordance with the disclosure.
Figure 12B:
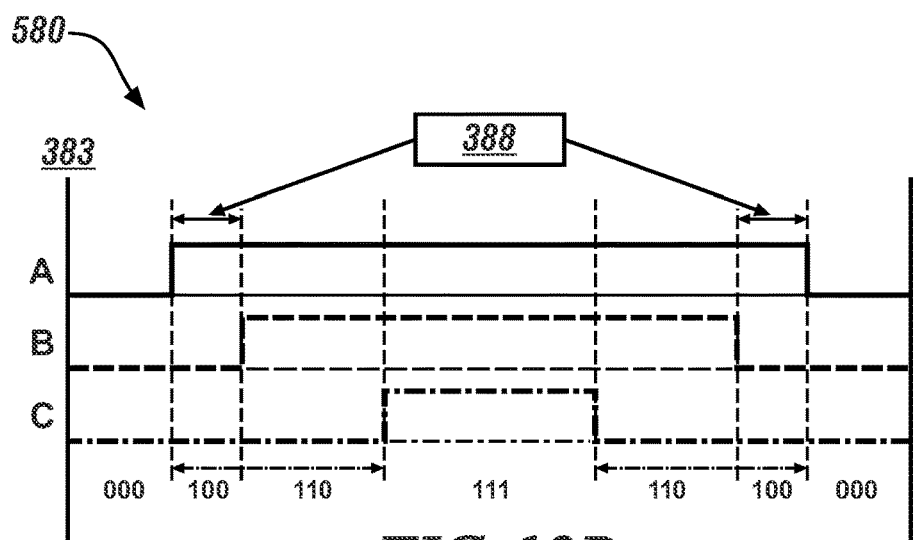
Figure 12C:
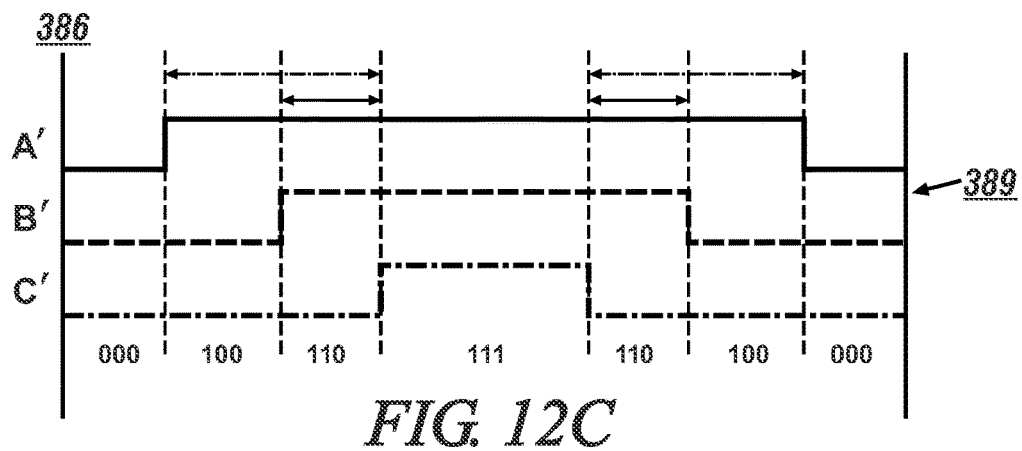

The double active vector clamp routine 580 is described with reference to FIGS. 12A, 12B, and 12C. FIG. 12A schematically illustrates the seventh region 380 with initial vector scheme 384. FIG. 12B graphically illustrates initial switch commands A, B, and C 383 for controlling the plurality of power transistors 35 of the inverter 30 employing the initial vector scheme 384 including vectors (000), (100), (110), (111), (110), (100), and (000) being executed sequentially in the manner shown. As indicated by 388, the durations, i.e., elapsed times between the initial switch commands for A and B is insufficient to attenuate line-to-line voltage oscillation that is induced by the first switching event prior to initiating the second switching event in sequential vectors. Referring again to FIG. 12A, the double active vector clamp routine 580 creates the adapted vector 384 by extending the duration of initial vector (100) to meet the minimum switching duration and decreasing the duration of initial vector (110) to maintain the magnitude of the initial voltage vector. The adapted vector scheme 386 including vectors (000), (100), (110), (111), (110), (100), and (000) and PWM switch commands A', B', and C' 389 being executed sequentially is graphically illustrated with reference to FIG. 12C. Thus, if the initial vector falls in this region, one of the active vector lengths is increased to meet twice the minimum switching, and the other is modified to keep the magnitude of the voltage vector the same to reduce additional disturbance in the system. If the PWM type is DPWM, the initial null vector is selected based on where it falls within the inverter voltage hexagon. Between (−30)-30, 90-150, 210-270 degrees, will start with the 000—null vector, everything else will start with the 111—null vector.

Figure 13A:
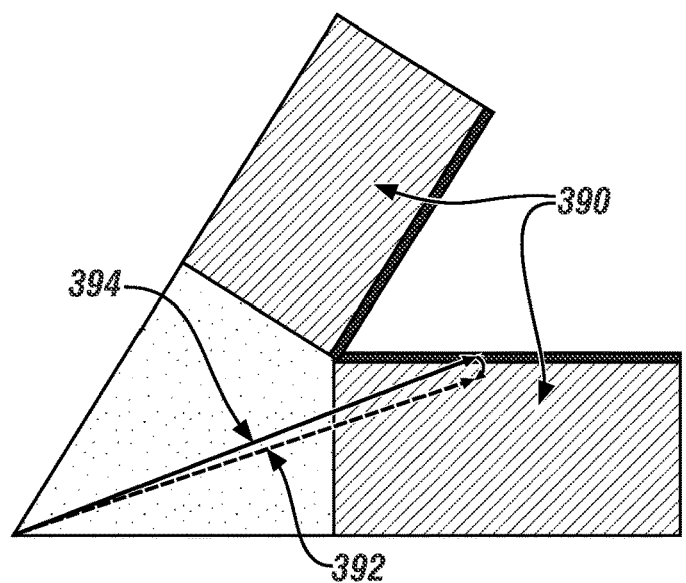
FIGS. 13A, 13B, and 13C illustrate details related to an increase duty cycle difference routine for an embodiment of the common mode current attenuation control routine, in accordance with the disclosure.
Figure 13B:
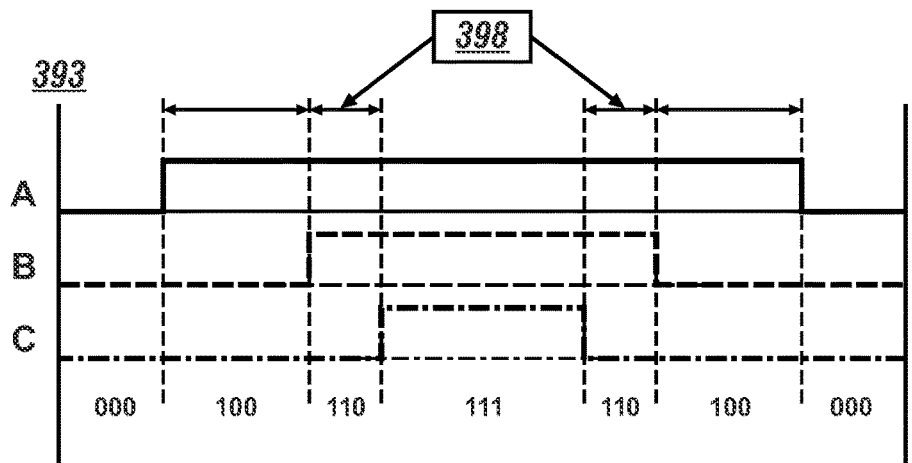
Figure 13C:
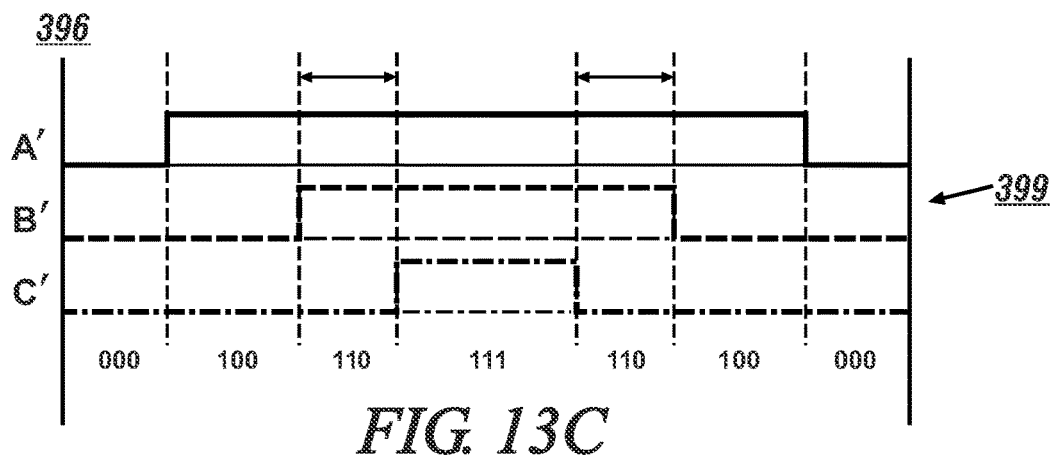

The increase duty cycle difference routine 590 is described with reference to FIGS. 13A, 13B, and 13C. FIG. 13A schematically illustrates the eighth region 390 with initial vector scheme 392. FIG. 13B graphically illustrates initial switch commands A, B, and C 393 for controlling the plurality of power transistors 35 of the inverter 30 employing the initial vector scheme 392 including vectors (000), (100), (110), (111), (110), (100), and (000) being executed sequentially in the manner shown. As indicated by 398, the durations, i.e., elapsed times between the initial switch commands for B and C are insufficient to attenuate line-to-line voltage oscillation that is induced by the first switching event prior to initiating the second switching event in sequential vectors. Referring again to FIG. 13A, the increase duty cycle difference routine 590 creates the adapted vector 394 by modifying, i.e., extending the duration of initial vector (100), and decreasing the duration of initial vector (110) to meet the minimum switching duration. The adapted vector scheme 396 including vectors (000), (100), (110), (111), (110), (100), and (000) and PWM switch commands A', B', and C' 399 being executed sequentially is graphically illustrated with reference to FIG. 13C.

The common mode current attenuation control routine 400 creates an adapted voltage vector and adapted PWM phased switch operation that achieve a minimum switching event separation for the power transistors 35 that is responsive to the commanded output from the rotary electric machine and provide a minimum switching event separation for the plurality of power transistors. In one embodiment, the minimum switching event separation for the plurality of power transistors is a minimum duration between consecutive switching events for the plurality of power transistors. The minimum duration is a time period that enables at least a minimum attenuation or decay of a line-to-line voltage oscillation caused by a first switching event prior to a second switching event. In one embodiment, the minimum duration is a time period that enables a 90% attenuation or decay of a line-to-line voltage oscillation caused by a first switching event prior to a second switching event. Alternatively, the minimum duration is a time period that enables greater than 90% attenuation (e.g., 100% attenuation) or decay of a line-to-line voltage oscillation caused by a first switching event prior to a second switching event. Alternatively, the minimum duration is a time period that enables less than 90% attenuation or decay of a line-to-line voltage oscillation caused by a first switching event prior to a second switching event. The magnitude of attenuation or decay of a line-to-line voltage oscillation may be determined in relation to the Modulation Index (MI), may be application-specific, and may calibratable.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A control system for a multi-phase rotary electric machine, comprising:
an inverter configured to transfer electric energy between a rechargeable energy storage device (RESS) and the multi-phase rotary electric machine, wherein the inverter is composed of a plurality of power transistors;
a controller, operatively connected to the plurality of power transistors of the inverter, the controller including an instruction set, the instruction set being executable to:
determine a commanded output from the multi-phase rotary electric machine;
determine an initial vector scheme responsive to the commanded output;
determine a minimum switching event separation for the plurality of power transistors;
determine an adapted vector scheme based upon the minimum switching event separation for the plurality of power transistors and the initial vector scheme; and
control the plurality of power transistors of the inverter employing the adapted vector scheme.

2. The control system of claim 1, wherein the instruction set being executable to determine the adapted vector scheme based upon the minimum switching event separation for the plurality of power transistors and the initial vector scheme comprises the instruction set being executable to alter pulsewidth modulated (PWM) duty cycles associated with the initial vector scheme based on the minimum switching event separation.

3. The control system of claim 2, wherein the instruction set being executable to alter pulsewidth modulated (PWM) duty cycles associated with the initial vector scheme based on the minimum switching event separation comprises the instruction set being executable to geometrically clamp pulsewidth modulated (PWM) duty cycles associated with the initial vector scheme based on the minimum switching event separation.

4. The control system of claim 2, wherein the initial vector scheme comprises a plurality of sequentially executed vectors; and wherein the instruction set being executable to alter pulsewidth modulated (PWM) duty cycles associated with the initial vector scheme based on the minimum switching event separation comprises the instruction set being executable to eliminate one of the plurality of sequentially executed vectors based on the minimum switching event separation.

5. The control system of claim 2, wherein the initial vector scheme comprises a plurality of sequentially executed vectors; and wherein the instruction set being executable to alter pulsewidth modulated (PWM) duty cycles associated with the initial vector scheme based on the minimum switching event separation comprises the instruction set being executable to eliminate one of the plurality of sequentially executed vectors and extend a duration of a remaining one of the plurality of sequentially executed vectors based on the minimum switching event separation.

6. The control system of claim 2, wherein the initial vector scheme comprises a plurality of sequentially executed vectors; and wherein the instruction set being executable to alter pulsewidth modulated (PWM) duty cycles associated with the initial vector scheme based on the minimum switching event separation comprises the instruction set being executable to decrease a duration of one of the plurality of sequentially executed vectors and extend a duration of a remaining one of the plurality of sequentially executed vectors based on the minimum switching event separation.

7. The control system of claim 2, wherein the initial vector scheme comprises a plurality of sequentially executed vectors composed of a plurality of initial pulsewidth modulated (PWM) switch commands, and wherein the adapted vector scheme is converted to a plurality of adapted PWM switch commands, wherein the adapted PWM switch commands includes the minimum switching event separation for the plurality of power transistors.

8. The control system of claim 1, wherein the minimum switching event separation for the plurality of power transistors comprises a minimum duration between a first switching event and a second switching event for the plurality of power transistors, wherein the minimum duration comprises a time period that enables attenuation of a line-to-line voltage oscillation induced by the first switching event prior to initiation of the second switching event.

9. The control system of claim 8, wherein the minimum duration comprises a time period that enables greater than 99% attenuation of a line-to-line voltage oscillation induced by the first switching event prior to initiation of the second switching event.

10. The control system of claim 1, wherein the commanded output of the rotary electric machine comprises a magnitude of rotational speed and a magnitude of torque.

11. A control system for a multi-phase rotary electric machine, comprising:
an inverter configured to transfer electric energy between a rechargeable energy storage device (RESS) and the multi-phase rotary electric machine, wherein the inverter is composed of a plurality of power transistors;
a controller, operatively connected to the plurality of power transistors of the inverter, the controller including an instruction set, the instruction set being executable to:
determine a minimum switching event separation for the plurality of power transistors;
determine an adapted vector scheme based upon the minimum switching event separation for the plurality of power transistors; and
control the plurality of power transistors of the inverter employing the adapted vector scheme.

12. The control system of claim 11, wherein the instruction set being executable to determine the adapted vector scheme based upon the minimum switching event separation for the plurality of power transistors comprises the instruction set being executable to alter pulsewidth modulated (PWM) duty cycles associated with an initial vector scheme based on the minimum switching event separation.

13. The control system of claim 12, wherein the instruction set being executable to alter pulsewidth modulated (PWM) duty cycles associated with the initial vector scheme based on the minimum switching event separation comprises the instruction set being executable to geometrically clamp pulsewidth modulated (PWM) duty cycles associated with the initial vector scheme based on the minimum switching event separation.

14. The control system of claim 12, wherein the initial vector scheme comprises a plurality of sequentially executed vectors; and wherein the instruction set being executable to alter pulsewidth modulated (PWM) duty cycles associated with the initial vector scheme based on the minimum switching event separation comprises the instruction set being executable to eliminate one of the plurality of sequentially executed vectors based on the minimum switching event separation.

15. The control system of claim 12, wherein the initial vector scheme comprises a plurality of sequentially executed vectors; and wherein the instruction set being executable to alter pulsewidth modulated (PWM) duty cycles associated with the initial vector scheme based on the minimum switching event separation comprises the instruction set being executable to eliminate one of the plurality of sequentially executed vectors and extend a duration of a remaining one of the plurality of sequentially executed vectors based on the minimum switching event separation.

16. The control system of claim 12, wherein the initial vector scheme comprises a plurality of sequentially executed vectors; and wherein the instruction set being executable to alter pulsewidth modulated (PWM) duty cycles associated with the initial vector scheme based on the minimum switching event separation comprises the instruction set being executable to decrease a duration of one of the plurality of sequentially executed vectors and extend a duration of a remaining one of the plurality of sequentially executed vectors based on the minimum switching event separation.

17. The control system of claim 11, wherein the minimum switching event separation for the plurality of power transistors comprises a minimum duration between a first switching event and a second switching event for the plurality of power transistors, wherein the minimum duration comprises a time period that enables attenuation of a line-to-line voltage oscillation induced by the first switching event prior to initiation of the second switching event.

18. A method for controlling an inverter configured to transfer electric energy to multi-phase rotary electric machine, wherein the inverter is composed of a plurality of power transistors, the method comprising:
   determining a commanded output from the multi-phase rotary electric machine;
   determining an initial vector scheme responsive to the commanded output;
   determining a minimum switching event separation for the plurality of power transistors;
   determining an adapted vector scheme based upon the minimum switching event separation for the plurality of power transistors and the initial vector scheme; and
   controlling the plurality of power transistors of the inverter employing the adapted vector scheme.

19. The method of claim 18, wherein the determining the adapted vector scheme based upon the minimum switching event separation for the plurality of power transistors and the initial vector scheme comprises altering pulsewidth modulated (PWM) switch commands associated with the initial vector scheme based on the minimum switching event separation.

20. The method of claim 18, wherein the minimum switching event separation for the plurality of power transistors comprises a minimum duration between a first switching event and a second switching event for the plurality of power transistors, wherein the minimum duration comprises a time period that enables attenuation of a line-to-line voltage oscillation induced by the first switching event prior to initiation of the second switching event.

* * * * *